Nov. 17, 1925.
A. GUTTLY
1,562,230
COUPLING ELEMENT ATTACHING APPARATUS
Filed Nov. 29, 1924     7 Sheets-Sheet 5
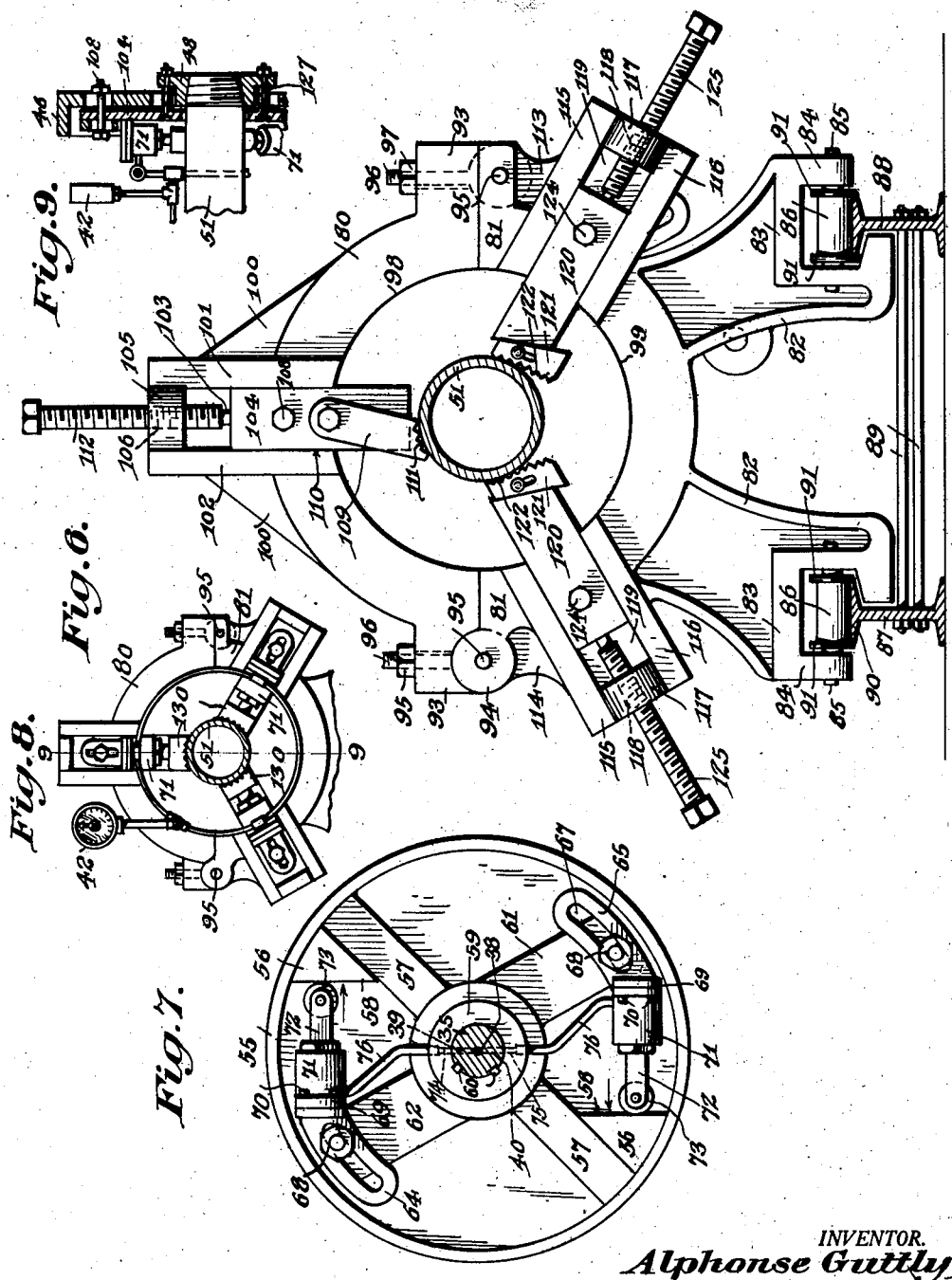
INVENTOR.
*Alphonse Guttly,*
BY
*Geo. F. Kimmel* ATTORNEY.

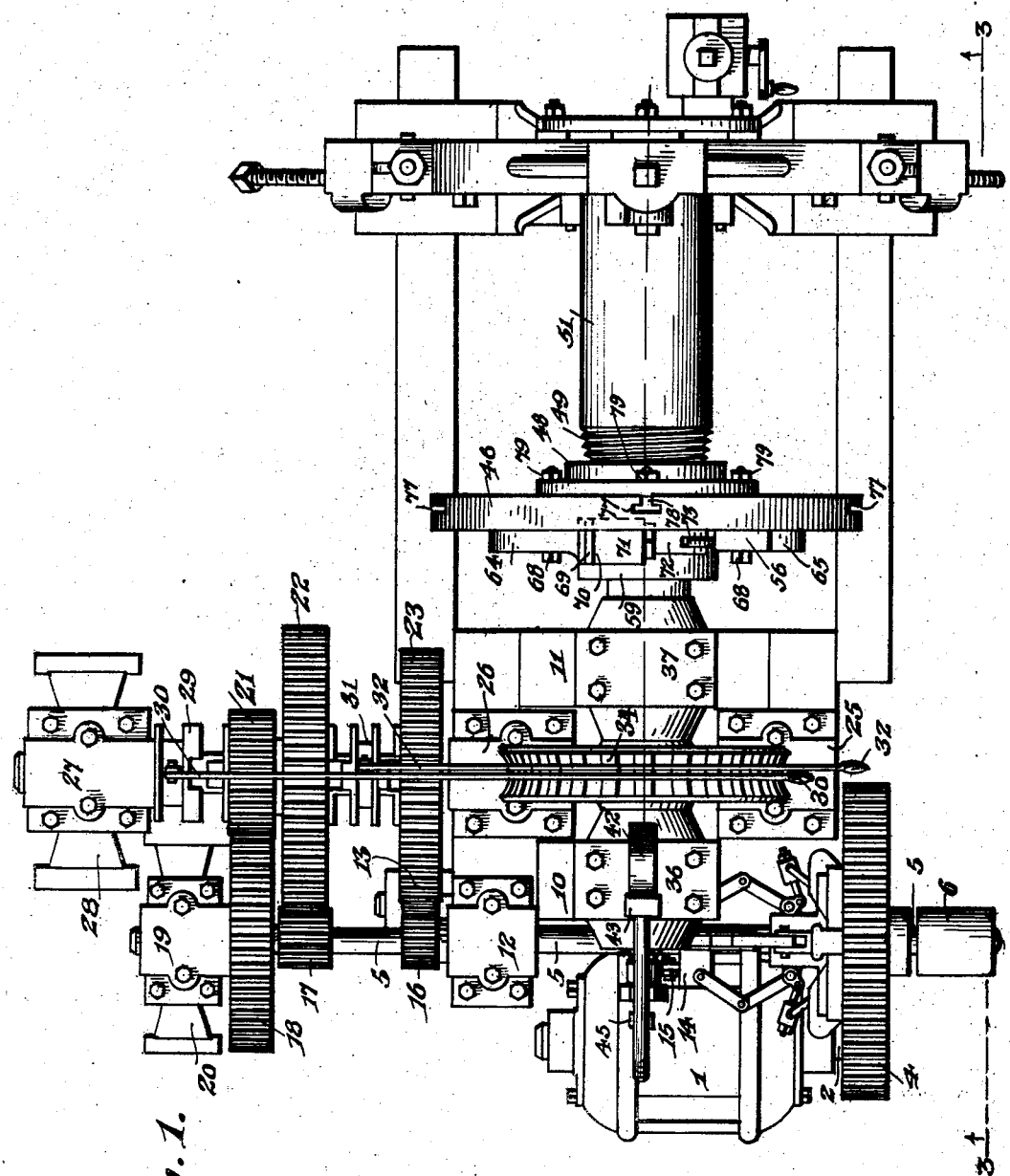

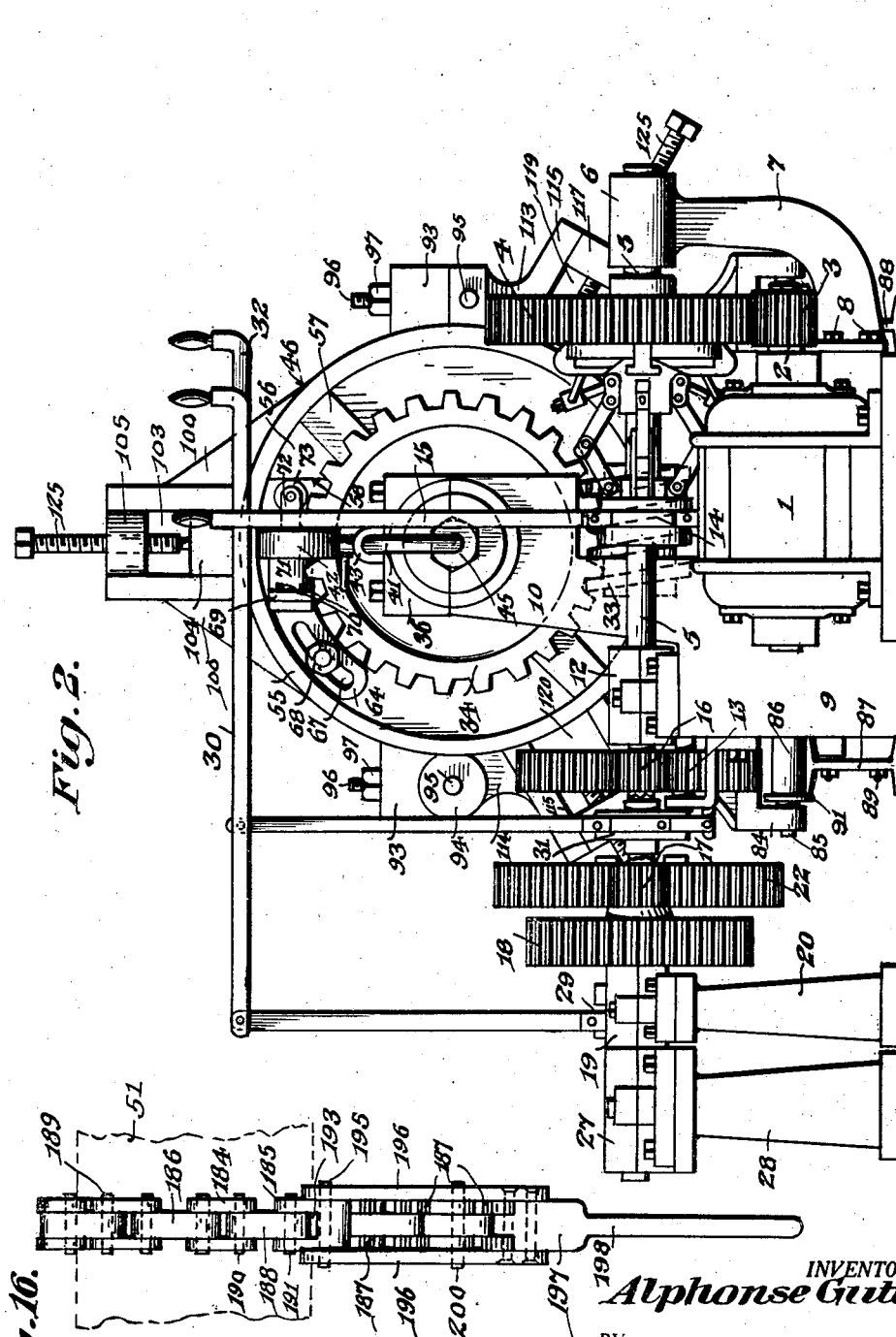

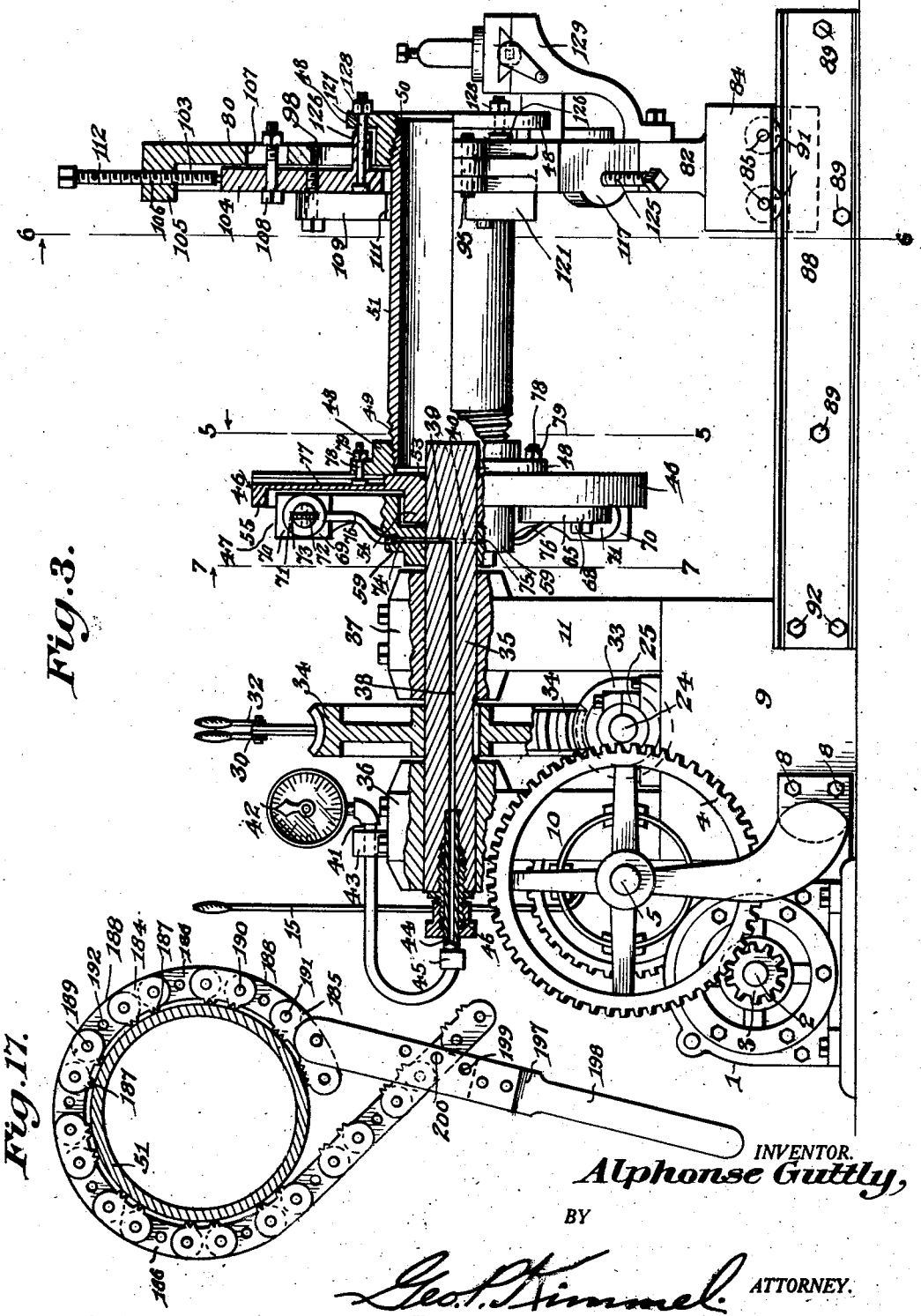

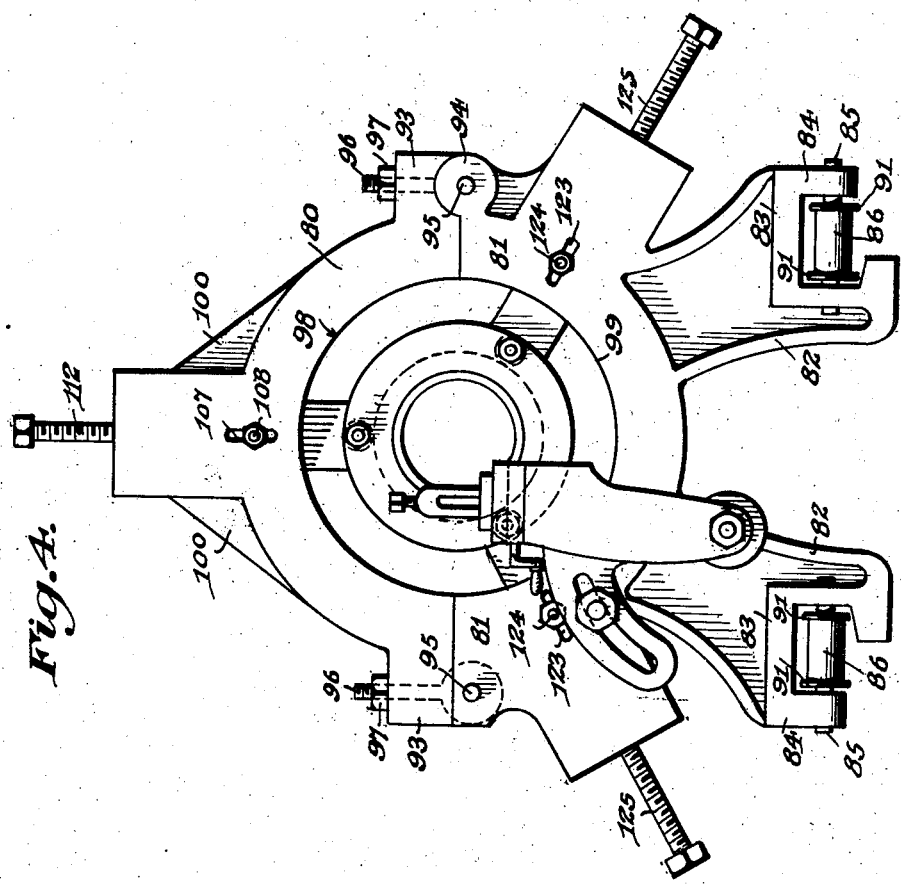

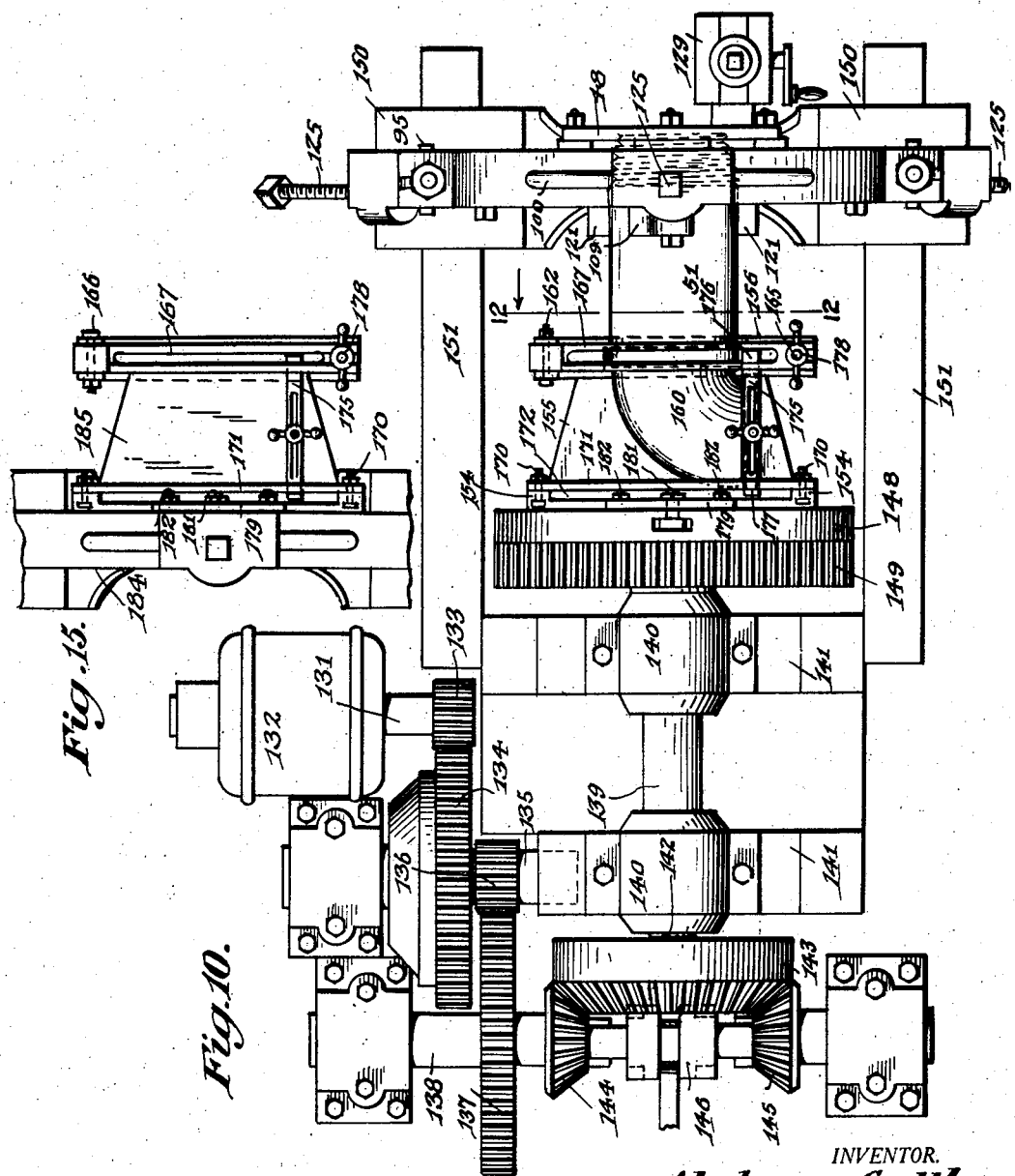

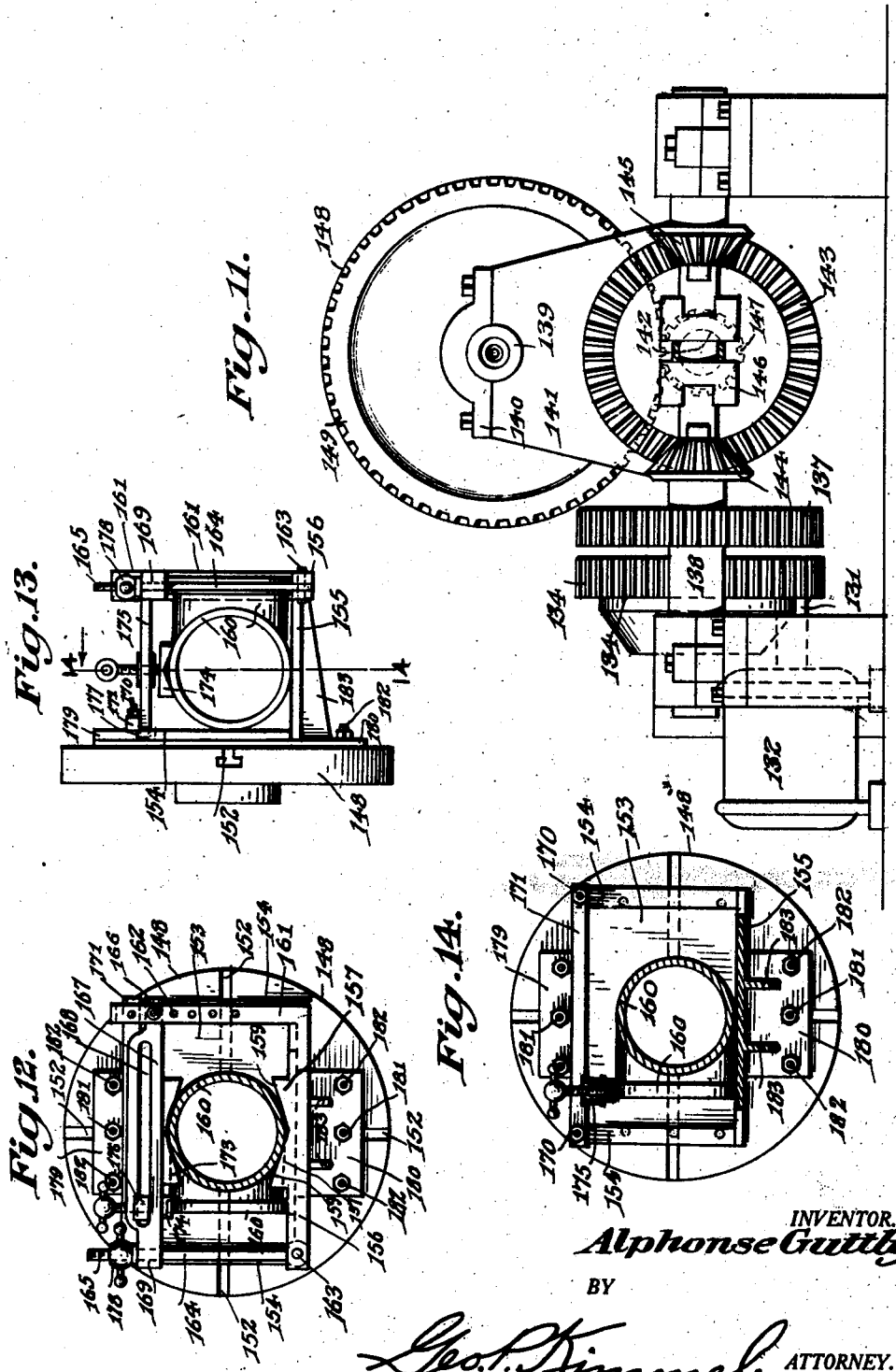

Patented Nov. 17, 1925.

1,562,230

UNITED STATES PATENT OFFICE.

ALPHONSE GUTTLY, OF WISCONSIN RAPIDS, WISCONSIN.

COUPLING-ELEMENT-ATTACHING APPARATUS.

Application filed November 29, 1924. Serial No. 753,001.

*To all whom it may concern:*

Be it known that I, ALPHONSE GUTTLY, a citizen of Switzerland, residing at Wisconsin Rapids, in the county of Wood and State of Wisconsin, have invented certain new and useful Improvements in Coupling-Element-Attaching Apparatus, of which the following is a specification.

This invention relates to a coupling element attaching apparatus designed primarily as an improvement upon the apparatus disclosed in Letters Patent #1,498,451, granted to me June 17, 1924, for pipe flange attaching machine, and not only embodies the objects and advantages as set forth by the Letters Patent aforesaid, but has for its further object to provide, in a manner as hereinafter set forth, an apparatus for not only attaching flanges to pipe sections of larger diameters, but further for expeditiously attaching elbows, angles, two-way, three-way and four-way couplings to the threaded ends of such pipe sections, thereby overcoming the employment of the large number of workmen required under existing conditions for placing, connecting or positioning a coupling element of large diameter on the end of the pipe section whereby a great saving in labor and expense is had.

Further objects of the invention are to provide, in a manner as hereinafter referred to, an apparatus for the purpose set forth, which is simple in its construction and arrangement, strong, durable, compact, thoroughly efficient and convenient in its use, readily assembled and comparatively inexpensive to install.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a top plan view of a coupling element attaching apparatus or machine, in accordance with this invention.

Figure 2 is a rear elevation thereof.

Figure 3 is a section on line 3—3, Figure 1.

Figure 4 is a front elevation of the adjustable holder.

Figure 5 is a section on line 5—5, Figure 3.

Figure 6 is a section on line 6—6, Figure 3.

Figure 7 is a section on line 7—7, Figure 3.

Figure 8 is a rear elevation of a modified form of adjustable holder.

Figure 9 is a fragmentary view, in section, of the modified form of holder shown in Figure 8.

Figure 10 is a top plan of a modified form of the apparatus.

Figure 11 is an end view of Figure 10.

Figure 12 is a section on line 12—12, Figure 10.

Figure 13 is a side view of the angle-shaped coupling element clamp.

Figure 14 is a section on line 14—14, Figure 13.

Figure 15 is a fragmentary view in plan of a holder provided with an angle coupling element clamp.

Figures 16 and 17 are respectively a side and edge of a pipe holding wrench.

Referring to Figures 1 to 6 of the drawings, 1 denotes a motor; 2 the shaft thereof provided at its outer end with a pinion 3 meshing with an enlarged gear wheel 4, loosely mounted on a drive shaft 5, journaled in bearings 6, 12 and 19.

The bearing 6 is carried by an arm 7 secured by holdfast devices 8 to one side of a supporting base 9, which is provided with standards 10 and 11. Mounted on the base 9 is the bearing 12. The gear 4 is adapted to be connected with the shaft 5 by a clutching mechanism 14. The shifting lever for the clutching mechanism 14 is indicated at 15.

Arranged at one side of the base 9 is a speed change gear controlling mechanism including gears 16, 17 and 18, which are of different diameters with respect to each other and are carried by the shaft 5, which is extended from the bearing 12 and journaled in the bearing 19 carried by a standard 20. The speed change gear controlling mechanism further includes gears 21, 22 and 23, loosely carried by a shaft 24 journaled in bearings 25, 26, which are secured to the base 9, and said shaft 24 projects from the bearing 26 and is journaled in a bearing 27 secured to the upper end of a standard 28 arranged forwardly of the standard 20. The gears 21, 22 and 23 are mounted on the shaft 24 at one side of the base 9. The gears 21, 22 and 23 are of different diameters with respect to each other, and said gear 21 meshes with the gear 18 and is of less diameter than the gear 18. Gear 22 meshes with the gear 17 and is of materially greater diameter than the gear 17 and of greater diameter than the gear 21. The gear 17 is of less diameter than the gear 18 and gear 16. The gear 23 meshes with a reverse drive pinion 13 meshing with the gear 16, and is of greater diameter than the latter and of less diameter than the gear 22. A clutch 29, operated by a lever 30, is provided for clutching the gear 21 to the shaft 24. A clutch 31, operated by a lever 32, is common to the gears 22 and 23 and when moved in one direction clutches the gear 22 to the shaft 24 and moved in the opposite direction clutches the gear 23 to the shaft 24.

The shaft 24 is arranged between the standards 10 and 11 and is provided with a worm 33 which meshes with a worm gear 34 fixed to an operating shaft 35, which is journaled in bearings 36, 37 secured to the upper ends of the standards 10 and 11 respectively. The shaft 35 projects forwardly from the standard 11 and is formed with an axial bore 38 extending from the rear end of said shaft 35 and terminating at a point removed from the forward end thereof. The forward end of the bore 38 terminates in a pair of oppositely extending radially disposed ports 39 and 40, which open at the periphery of the shaft 35 at a point removed from the forward end thereof.

Communicating with a fluid pressure supply, not shown, is a fluid pressure supply pipe 41, having a gage 42 connected therewith. The pipe 41 is supported by a bracket 43 on the top of the bearing 36, and said pipe 41 is provided with a discharge nozzle 44 swivelly connected, as at 45, to the pipe 41. The nozzle 44 is extended into the rear end of the shaft 35 and registers with the bore 38. The nozzle 44 is bodily carried with the shaft 35 during the operation thereof. A packing element 46 is mounted on the nozzle 44 and is extended into the rear end of the shaft 35 and is bodily carried with the nozzle 44 and shaft 35.

That end of the shaft 38, which projects forwardly from the standard 11 carries a chuck element which is adapted to have that coupling element which is to be attached to the pipe detachably secured therewith. The chuck element is formed of a front and a rear section referred to generally by the reference characters 46, 47 respectively. The section 46 is loosely mounted on the shaft 35 and the section 47 is fixedly secured to the shaft 35 and is provided with means for coupling the section 46 therewith, whereby the chuck will be revolved with the shaft 35 for the purpose of attaching the coupling element, indicated at 48 in Figure 3, upon one of the threaded ends 49 or 50 of the pipe 51.

The section 46 of the chuck consists of a circular disk 52 formed with a central opening 53 for the purpose of mounting the disk on the shaft 35. The disk 52 has a rearwardly directed hub 54, a rearwardly directed annular flange 55 flush with the edge thereof, and a pair of diametrically disposed oppositely extending triangular-shaped abutments 56 on the rear face thereof and which extend from the inner face of the flange 55. The rear face of the disk 52 is furthermore provided with a pair of reinforcing webs 57 of materially less thickness than the thickness of the abutments 56 and which terminate in one side of the abutments 56. The webs 57 also terminate in the hub 54 and are of less thickness than the length of said hub. The side 58 of each abutment is adapted to be impacted by a propelling element which carries the section 46 with the section 47 during the operation of the shaft 35, and the said propelling members are carried by the section 47 and will be presently referred to.

The section 47 comprises a hub 59, which is keyed, as at 60, to the shaft 35. The hub 59 is constructed to overlap as well as being spaced from, the hub 54 of the section 46. The section 47 further includes a pair of oppositely extending radially disposed arms 61, 62, which are formed integral with the hub 59, forwardly thereof and which have their outer ends partially surrounded by the flange 55. Adjustably mounted against the rear faces at the outer ends of the arms 61, 62, is a pair of oppositely extending supporting brackets 64, 65 and each of which is formed with an arcuate slot 67. Extending through the outer ends of the arms 61, 62 and through the slots 67 are hold-fast devices 68 and which provide means in connection with the slots 67 for adjustably connecting the supporting brackets to the arms 61, 62. Each of the supporting brackets is flanged at one end, as at 69, and secured thereto by the hold-fast devices 70 is a cylinder 71, carrying a fluid pressure operated propeller member 72, formed at its outer end with a roller 73, adapted to yieldingly engage a side 58 of an abutment 56 for the purpose of driving the section 46 with the section 47 to provide for the revolving of the section 46 with the shaft 35. The propeller members 72 are oppositely disposed with respect to each other and are positioned to engage the abutments 56 prior to the operation of the shaft 35.

The hub 59 is provided with a pair of ports 74, 75. The former registers with the port 39 and the latter with the port 40.

Leading from the port 74, as well as the port 75, is a fluid pressure conducting pipe 76. The pipes 76 open into the cylinder 71.

The section 46 is provided with a series of radially extending dovetailed slots 77, and each of which extends from the edge of the disk 52 and terminates at a point removed from the opening 53, and said slots are employed in connection with the headed bolts 78 to detachably secure the coupling element 48 to the chuck. The bolts 78 extend through the element 48 and carry nuts 79 to connect the element 48 to the chuck. The slots 77 provide means whereby the coupling elements 48 of varying diameter can be detachably connected to the chuck for the purpose of attaching such elements to the pipes.

When the members 72 are projected from the cylinder 71 on a supply of fluid pressure, they yieldingly impact against the abutment 56, and on the operation of shaft 35, both sections of the chuck will be carried thereby and if element 48 is secured to the section 46, the said element 48 will be threaded upon the end 49 of the pipe 51, as shown in Figure 3.

During the positioning of the element 48 upon the pipe 51, it requires the holding of said pipe 51 stationary and for such purpose a portable holder is employed and which as illustrated in Figures 1, 3, 4 and 6 consists of a stand comprising a body portion formed of an upper section 80 and a lower section 81. The section 80 is detachably connected to the section 81 and each of said sections is substantially semi-circular in contour. The section 81 has depending therefrom a pair of legs 82, formed with an offset portion 83 provided with a depending extension 84. The leg 82 depends below the extension 84, and carried by the leg 82 as well as the extension 84, is a shaft 85 provided with a flanged wheel or roller 86.

The holder is shiftable upon a trackway formed of a pair of rails 87, 88, connected together by tie bars 89. When the holder is mounted on the rails 87, 88 the legs 82 are so constructed as to extend under the inner sides of the heads 90 of the rails. The extensions 84 are positioned exteriorly of the rails and the flanged rollers 86 travel on the heads 90 and with the flanges 91 of each roller 86 opposing the edges of the head 90 of a rail. See Figure 6. The rails 87 and 88 are secured, by the hold-fast devices 92, to the base 9 and project forwardly therefrom a substantial distance. The setting up of the holder portable in the manner as stated enables the employment of the same in connection with pipes of different lengths.

The section 80 is formed with a pair of oppositely extending bifurcated flanges 93, which seat on a pair of bifurcated flanges 94 carried by the section 81. Pivotally connected to each of the flanges 94, by a shaft 95, is a retaining bolt 96 adapted to be swung to extend through a flange 93, as well as project above said flange, and the bolt 96 carries a clamping nut 97. When the nuts 97 are in the position as shown in Figure 4, the section 80 is detachably secured to the section 81 and the inner edge 98 of the section 80 forms a continuation of the inner edge 99 of the section 81. When the sections 80 and 81 are detachably secured together an enlarged circular opening is provided for the passage of the pipe 51.

The section 80 has projecting therefrom a web 100 and formed integral therewith is a pair of guide bars 101, 102, which extend across the inner face of the section 80 and are spaced from each other, forming a pocket 103 for an adjustable locking member 104. The guide bars 101, 102, at their outer ends, are connected together by a cross piece 105 provided with an opening 106 formed with a threaded wall. The section 80 has a slot 107 through which extends a bolt 108 carried by the member 104, whereby the latter is slidably connected to the section 80. The member 104 is of a length to project inwardly from the inner edge of the section 80 and carries a locking dog 109, which is pivotally connected as at 110 to the member 104. The dog 109 has its inner end toothed, as at 111. Threadedly engaging with the wall of the opening 106 and engaging with the member 104 is an adjusting screw 112.

The section 81 is formed with a pair of oppositely extending webs 113, 114, and integral with each of said webs is a pair of spaced guide bars 115, 116 connected together at their outer ends by a cross bar 117 formed with an opening 118 having a threaded wall. The guide bars 115, 116 extend across the inner face of the section 81 and form a pocket 119 for a locking member 120, having slidably connected to its inner end a locking wedge 121, formed with a toothed inner side 122. The section 81 is formed with a pair of slots 123 through each of which extends a bolt 124 carried by a locking member 120 for the purpose of slidably connecting the latter to the section 81. Extending through each bar 117, as well as threadedly engaging with the wall of the opening 118 therein, is an adjusting screw 125 which engages the locking member 120. The locking members are employed for fixedly securing the pipe 51 from movement during the attaching of a coupling element to the opposite end of a pipe. The arrangement of the locking members in locking position with respect to the pipe 51 is shown in Figure 9.

Each of the locking members is provided with a forwardly extending boss 126 positioned inwardly of the inner edge of a section 80 or 81 and through the locking member and its boss 126 is passed a bolt 127 for connecting the coupling element 48 to hold it from movement when the pipe 51 is secured stationary by the locking members. Each of the bolts 127 carries a clamping nut 128.

The section 81 carries a turning and cutting device, as indicated at 129.

In the form shown in Figures 8 and 9, the holder is provided with a series of fluid pressure operated locking members 130 in lieu of manually adjustable locking members, as shown in Figure 6.

In the modification shown in Figures 10 to 14, 131 indicates the shaft of a motor 132. The shaft 131 carries a pinion 133 meshing with the gear 134 carried by a drive shaft 135, which is also provided with a pinion 136 meshing with a gear 137 on a counter-shaft 138. The supporting shaft of the apparatus is indicated at 139 and is journaled in bearings 140 carried by a pair of standards 141. Arranged below the shaft 139 and projecting rearwardly from the rear standard 140 is a transmission shaft 142 carrying a bevelled gear 143, which is engaged and operated by the bevelled gears 144, 145 carried by the counter-shaft 138. A clutch 146 is provided for alternately clutching the gears 144 and 145 to the shaft 138 for the purpose of driving the gear 143 forward and reverse. The forward end of the shaft 142 carries a pinion 147, which engages and revolves the chuck 148, which is secured on the forward end of the shaft 139. The chuck 148 includes a gear wheel 149, which is arranged over the pinion 147 and is driven thereby.

In the form shown in Figures 10 to 14, a holder 150 similar to that as shown in Figure 6 can be used and which travels on the tracks 151.

The construction shown in Figures 10 to 14 inclusive can be employed for attaching coupling elements, in the form of elbows, angles, two, three and four-way couplings to the threaded end of the pipe and for such purpose a coupling element clamp is employed in connection with the chuck and said clamp is connected to the forward face of the chuck and is so constructed as to fixedly maintain the coupling section in position, not only to be carried by the chuck but for the purpose of attaching it to the end of the pipe. The chuck 148 has radially extending dovetail slots 152 for the purpose of securing the clamp horizontally or vertically with respect to the chuck.

The clamp, best shown in Figures 12, 13 and 14, comprises a back plate 153, which is rectangular in contour and provided at each end with a transversely extending forwardly disposed rib 154. Formed integral with the plate 153 is a forwardly extending tapered bottom plate 155. The bottom plate 155 terminates at its forward end in a longitudinally extending bar 156 of a length greater than the width of the plate 155 at its forward terminus. The bar 156, centrally of its upper face, has an upstanding projection 157, having its top edge inclining downwardly from each end towards its center, as at 159, providing a seat for the coupling element 160. Formed integral with one end of the bar 156 is a vertically disposed bar 161 having a row of superposed openings 162, and the bar 161 is of a height to extend above the back plate 153. Pivotally connected to the other end of the bar 156, as at 163, is a vertically disposed rod 164, threaded at its upper end, as at 165. Adjustably connected at one end to the bar 161 by a bolt 166, is an adjustable clamping bar 167 provided with a longitudinally extending slot 168. The other end of the clamping bar 167 is provided with an opening 169 through which extends the rod 164. Secured to the upper ends of the ribs 154 by the hold-fast devices 170 is a retaining bar 171, which forms in connection with the back plate 153 a slot 172. The clamping bar 167 has depending therefrom a clamping extension 173, which engages the element 160 and coacts with the extension 157 for the purpose of fixedly securing the forward end of the element 160. The rear end of the element 160 is mounted on the bottom plate 155 and is fixedly secured in position by an adjustable clamp 174, which is shiftable lengthwise of a slotted retaining bar 175, extending from the bar 167 to the back plate 173. The bar 175 is upturned at its forward end, as at 176, and at its rear end, as at 177. The bar 175 has its upturned forward end extend through the slot 168 and its upturned rear end extended in the space 172, and by this arrangement the bar is maintained in position. Carried by the threaded end 165 of the rod 164 is an adjustable clamping member 178, which bears against the bar 167.

The back plate 173 is provided at its upper end with a vertically disposed flange 179 and at its lower end with a depending flange 180. The flanges 179, 180 carry connecting devices 181 for detachably securing the clamp to the front of the chuck. Extending through the flanges 179, 180 and detachably engaging in the chuck are securing devices 182. Formed integral with the bottom plate 155 and the flange 180 are reinforcing webs 183. The connecting devices 181 operate in the slots 152.

In Figure 15, a holder is indicated at 184 and which has connected to its forward side a clamp 185 of a form similar to that shown in Figures 12, 13 and 14 and said clamp 185 is employed for holding an angle-shaped coupling member from movement on one end of the pipe when the other end of the pipe is having a coupling element attached thereto.

In lieu of providing the chuck 148 with the gear 149, the latter can be positioned at any suitable place on the shaft 142, and the pinion 147 adjusted accordingly.

In Figures 16 and 17, there is illustrated a wrench for holding the pipe 51 and which comprises a clamping member formed of a set of gripping links 184, a gripping member 185 and a set of spacing links 186. The links 184 are alternately disposed with respect to the links 186. The gripping links are arranged in pairs and with the links of each pair opposing each other. The inner edge of each of the links 184 is provided with gripping teeth 189 to engage the pipe. Each of the links 186, with the exception of one which is indicated at 188, extends between and is pivotally connected as at 189 to opposed pairs of links 184. The link 188 is interposed between the gripping member 185 and a pair of links 184, as well as being pivotally connected to the former, as at 190 and to the latter, as at 191. Each of the links 186, intermediate its ends, is provided with an opening 192.

The gripping member 185 is bifurcated, as at 193, formed on its inner edge with gripping teeth 194 and of greater length than a link 184. The member 185 is pivotally connected, as at 195, between the forward end of a pair of opposed straps 196, and secured between the rear ends of these latter is the head 197 of a handle 198. Each of the straps 196 is formed with a lengthwise extending row of openings 199 and with the openings of one row aligning with the openings of the other row, and each pair of aligning openings 199 is adapted to register with an opening 192 whereby a locking pin 200 can be mounted in the said registering openings, when the free end of the clamping member extends between the straps 196, for the purpose of securing said member in clamping engagement with respect to the pipe 51.

The apparatus is not only adapted for securing the coupling elements on the ends of the pipe, but also for removing said elements as well, and it is thought that the many advantages embodied in an apparatus of the construction referred to for expeditiously positioning large coupling elements on pipe sections can be readily understood, and although the preferred embodiment of the invention is as illustrated and described, yet it is to be understood that changes in the details of construction can be had which will fall within the scope of the invention as claimed.

What I claim is:—

1. A coupling element attaching apparatus comprising a revoluble chuck formed of a driving and a driven section, the former extending into the rear of the latter, fluid pressure operated means carried by said driving section and yieldingly impacting with the rear of said driven section to provide for the bodily revolving of the chuck, means for detachably securing the coupling element to be attached to the front of said driven section, a non-rotative combined pipe locking and positioning means for supporting one end of and for positioning a pipe for the reception on its other end of the coupling element carried by said driven section, and a portable holder for said locking and positioning means.

2. A coupling element attaching apparatus comprising a revoluble chuck formed of a driving and a driven section, the former extending into the rear of the latter, fluid pressure operated means carried by said driving section and yieldingly impacting with the rear of said driven section to provide for the bodily revolving of the chuck, means for detachably securing the coupling element to be attached to the front of said driven section, a non-rotative combined pipe locking and positioning means for supporting one end of and for positioning a pipe for the reception on its other end of the coupling element carried by said driven section, a portable holder for said locking and positioning means, and an operating shaft for said driving section, said shaft having means for conducting fluid pressure to said coupling means.

3. A coupling element attaching apparatus comprising a revoluble chuck formed of a driving and a driven section, the former extending into the rear of the latter, fluid pressure operated means carried by said driving section and yieldingly impacting with the rear of said driven section to provide for the bodily revolving of the chuck, means for detachably securing the coupling element to be attached to the front of said driven section, a non-rotative combined pipe locking and positioning means for supporting one end of and for positioning a pipe for the reception on its other end of the coupling element carried by said driven section, a portable holder for said locking and positioning means, and means for detachably connecting a coupling element to said combined locking and positioning means.

4. A coupling element attaching apparatus comprising a revoluble chuck formed of a driving and a driven section, the former extending into the rear of the latter, fluid pressure operated means carried by said driving section and yieldingly impacting with the rear of said driven section to provide for the bodily revolving of the chuck, means for detachably securing the coupling element to be attached to the front of said driven section, a non-rotative combined pipe locking and positioning means for supporting one end of and for positioning a pipe for the reception on its other end of the coupling element carried by said driven section, a portable holder for said locking and positioning means, an operating shaft for said driving section, said shaft having means for conducting fluid pressure to said coupling means, and means for detachably connecting a coupling element to said combined locking and positioning means.

5. In an apparatus for the purpose set forth a revoluble shaft, a chuck carried thereby and formed of two sections, one loose and the other fixed to said shaft, said fast section extending into the rear of the loose section, fluid pressure operated means carried by the fixed section and yieldingly impacting with the rear of the loose section to provide for the bodily revolving synchronously of said sections, means to provide for the passage of fluid pressure through said shaft to said fluid pressure operated means, and means for detachably connecting a coupling element to be attached to the forward face of said loose section.

6. In an apparatus for the purpose set forth a revoluble shaft, a chuck carried thereby and formed of two sections, one loose and the other fixed to said shaft, said fast section extending into the rear of the loose section, fluid pressure operated means carried by the fixed section and yieldingly impacting with the rear of the loose section to provide for the bodily revolving synchronously of said sections, means to provide for the passage of fluid pressure through said shaft to said fluid pressure operated means, and means for detachably connecting an annular coupling element of L-shaped cross section which is to be attached to the pipe to the front face of said loose section.

7. In an apparatus for the purpose set forth comprising a revoluble shaft, a chuck carried thereby, means for fixedly clamping an annular coupling element of L-shaped cross section in position to be attached to one end of a pipe, said means including spaced clamp members arranged at right angles to each other to engage the ends of said element, and means for detachably connecting said clamping means against the forward face of said chuck.

8. In an apparatus for the purpose set forth comprising a revoluble shaft, a chuck carried thereby, means for fixedly clamping an annular coupling element of L-shaped cross section in position to be attached to one end of a pipe, said means including spaced clamp members arranged at right angles to each other to engage the ends of said element, means for detachably connecting said clamping means against the forward face of said chuck, a shiftable holder opposing said chuck, and adjustable means carried by the holder and engaging the other end of the pipe for locking and positioning the pipe to receive the said coupling element.

9. In an apparatus for the purpose set forth comprising a revoluble shaft, a chuck carried thereby, means for fixedly clamping an annular coupling element of L-shaped cross section in position to be attached to one end of a pipe, said means including spaced clamp members arranged at right angles to each other to engage the ends of said element, means for detachably connecting said clamping means against the forward face of said chuck, a shiftable holder opposing said chuck, adjustable means carried by the holder and engaging the other end of the pipe for locking and positioning the pipe to receive the said coupling element, and means for locking from movement a coupling element on that end of the pipe engaged by said locking and positioning means.

10. An apparatus for the purpose set forth comprising a revoluble chuck formed of a front driven section and a rear driving section, fluid pressure operated means carried by the driving section and yieldingly impacting the rear of the driven section to provide for the bodily revolving of said sections synchronously, said driven section formed in its front face with radially disposed slots opening at the outer edge of said section, and means operating in said slots for detachably connecting coupling elements of varying sizes to the forward face of said driven section.

11. In an apparatus for the purpose set forth, a holder formed of a pair of semi-circular sections detachably connected together, one of said sections provided with supporting legs carrying rollers to permit of the shifting of the holder in opposite directions, and adjustable means slidably connected to said sections and extending from the inner edge thereof for locking and positioning a pipe.

12. In an apparatus for the purpose set forth, a holder formed of a pair of semi-circular sections detachably connected together, one of said sections provided with supporting legs carrying rollers to permit of the shifting of the holder in opposite directions, adjustable means slidably connected to said sections and extending from the inner edge thereof for locking and positioning a pipe, and means extending through said pipe locking and positioning means for locking from movement a coupling element attached to the pipe.

13. An apparatus for the purpose set forth comprising a prime mover, a revoluble coupling element applying device driven therefrom for attaching the element carried thereby to one end of a pipe and including fluid pressure operated means for imparting resiliency thereto during its operation, and means for detachably connecting the coupling element to said device.

14. An apparatus for the purpose set forth comprising a prime mover, a revoluble coupling element applying device driven therefrom for attaching the element carried thereby to one end of a pipe and including fluid pressure operated means for imparting resiliency thereto during its operation, a clamping device for an annular coupling element of L-shaped cross section, and means for detachably connecting said clamping device to said applying device.

15. An apparatus for the purpose set forth comprising a prime mover, a revoluble coupling element applying device driven therefrom for attaching the element carried thereby to one end of a pipe and including fluid pressure operated means for imparting resiliency thereto during its operation, means for detachably connecting the coupling element to said device, and a non-rotative shiftable holder opposing said device and provided with radially disposed elements slidably connected therewith for locking and positioning the pipe, said holder further including shifting means for said radially disposed elements.

16. An apparatus for the purpose set forth comprising a prime mover, a revoluble coupling element applying device driven therefrom for attaching the element carried thereby to one end of a pipe and including fluid pressure operated means for imparting resiliency thereto during its operation, a clamping device for an annular coupling element of L-shaped cross section, means for detachably connecting said clamping device to said applying device, and a non-rotative shiftable holder opposing said device and provided with radially disposed elements slidably connected therewith for locking and positioning the pipe, said holder further including shifting means for said radially disposed elements.

In testimony whereof, I affix my signature hereto.

ALPHONSE GUTTLY.